(12) United States Patent
Wong

(10) Patent No.: US 6,397,735 B1
(45) Date of Patent: Jun. 4, 2002

(54) ELECTRONIC FOOD PROCESSOR

(75) Inventor: Wal Hung Wong, Kowloon (CN)

(73) Assignee: Kayue Electric Company Limited, Kowloon (CN)

( * ) Notice: Subject to any disclaimer, the term of this patent is extended or adjusted under 35 U.S.C. 154(b) by 0 days.

(21) Appl. No.: 09/934,214

(22) Filed: Aug. 21, 2001

(51) Int. Cl.$^7$ .................. A23N 1/00; A47J 43/046; A47J 43/07; B02C 18/16; A23L 1/00
(52) U.S. Cl. .................. 99/492; 99/337; 99/348; 241/37.5; 241/92; 366/601
(58) Field of Search .................. 99/337, 338, 326–333, 99/486, 492, 348, 501–513; 241/37.5, 92, 36, 282.1, 282.2, 280; 83/356.3, 355; 200/302.1–302.3; 361/195–203; 219/492, 442, 494, 506, 486, 714; 340/870.17; 318/811, 772; 700/90; 366/601

(56) References Cited

U.S. PATENT DOCUMENTS

| | | | | |
|---|---|---|---|---|
| 4,371,118 A | * | 2/1983 | Sontheimer et al. | ... 241/37.5 X |
| 4,542,857 A | * | 9/1985 | Akasaka | .................. 99/492 X |
| 4,629,131 A | * | 12/1986 | Podell | ....................... 241/92 X |
| 4,691,870 A | * | 9/1987 | Fukunaga et al. | ........ 99/492 X |
| 4,741,482 A | * | 5/1988 | Coggiola et al. | .... 241/282.1 X |
| 4,799,626 A | * | 1/1989 | Hickel et al. | ............. 99/492 X |
| 4,921,174 A | * | 5/1990 | Okada et al. | ............... 241/37.5 |
| 4,921,175 A | * | 5/1990 | Okada et al. | ........... 366/314 X |
| 5,244,275 A | * | 9/1993 | Bauer et al. | .............. 99/510 X |
| 5,347,205 A | * | 9/1994 | Piland | .................... 366/601 X |
| 5,435,237 A | * | 7/1995 | Huang | .......................... 99/492 |
| 5,454,299 A | * | 10/1995 | Gonneaud | .................... 99/492 |
| 5,768,978 A | * | 6/1998 | Dorner et al. | .......... 366/601 X |

* cited by examiner

Primary Examiner—Timothy F. Simone
(74) Attorney, Agent, or Firm—Alix, Yale & Ristas, LLP

(57) ABSTRACT

A food processor incorporates an electronic motor control and display. Times relevant to the operation of the food processor are displayed for reference by the user. A user can select a food processing cycle duration, in which case the display is operated in a count-down mode. If no duration is selected, the display is operated in a count-up mode. Measured motor speed is used by a microprocessor based motor control circuit to regulate power delivered to the drive motor. A programmed auto pulse function delivers power to the drive motor in an on off pattern, freeing the user's hands. A safety switch is arranged to sense the presence or absence of the food pusher in the chute. Operation of the food processor drive motor is paused until the food pusher is replaced in the chute. The food processor is provided with a high-speed function.

18 Claims, 11 Drawing Sheets

* A is set time.
* Tmax is maximum count-up time.
* Fson is start on frequency.
* Fsoff is start off frequency.
* H/S = High Speed

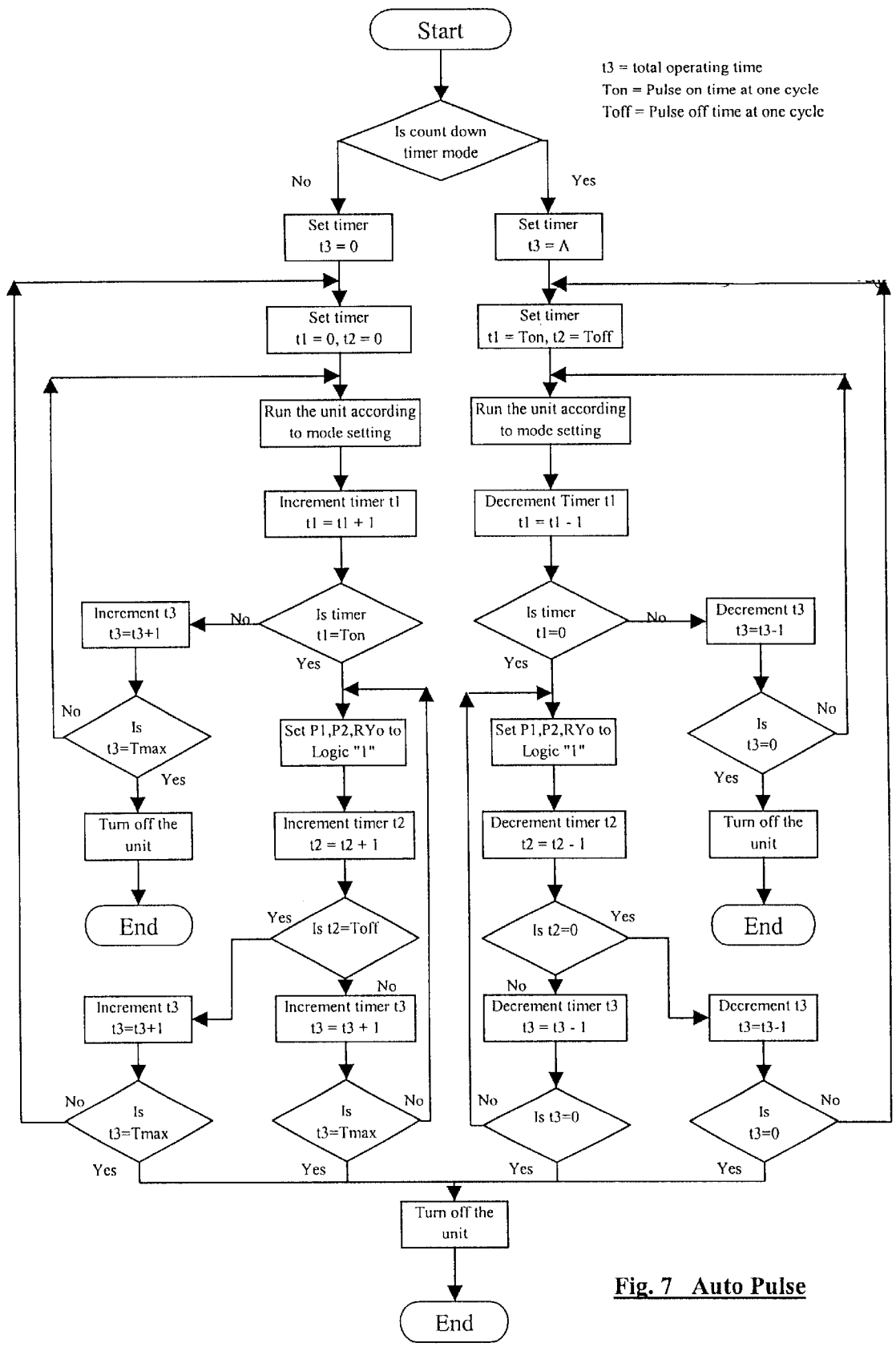
Fig. 7 Auto Pulse

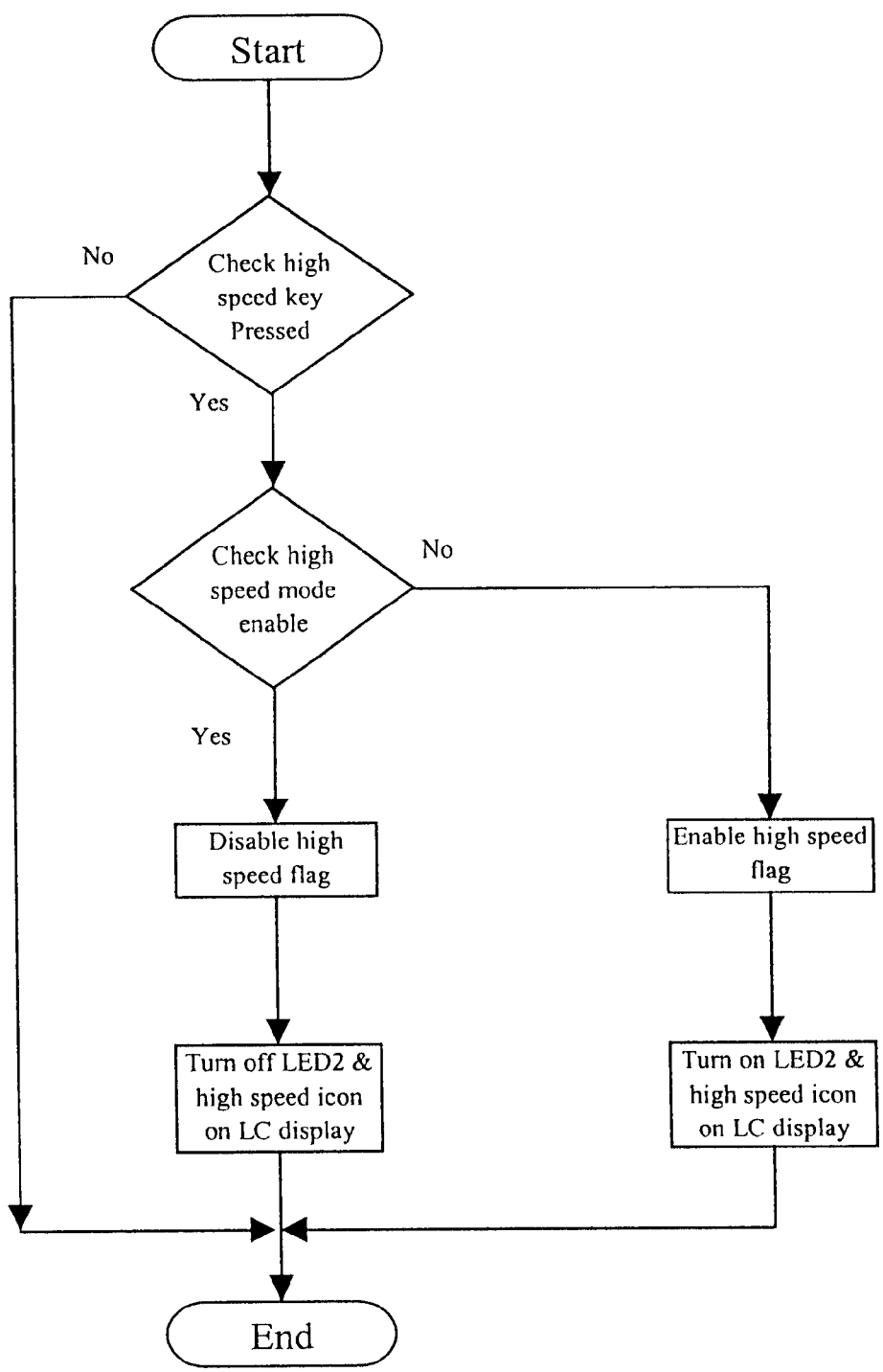
Fig.8  High Speed

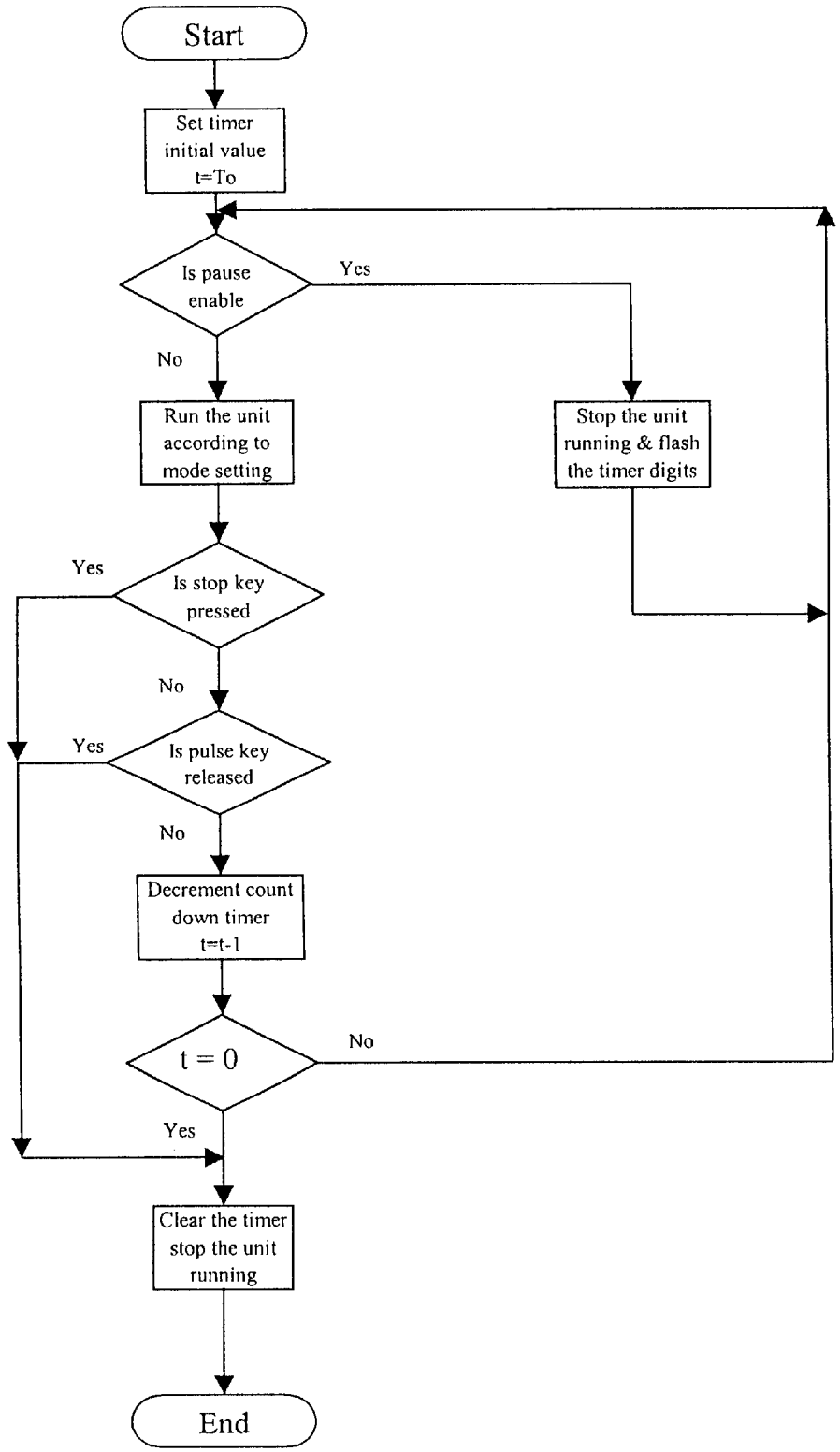
Fig. 9 Count Down

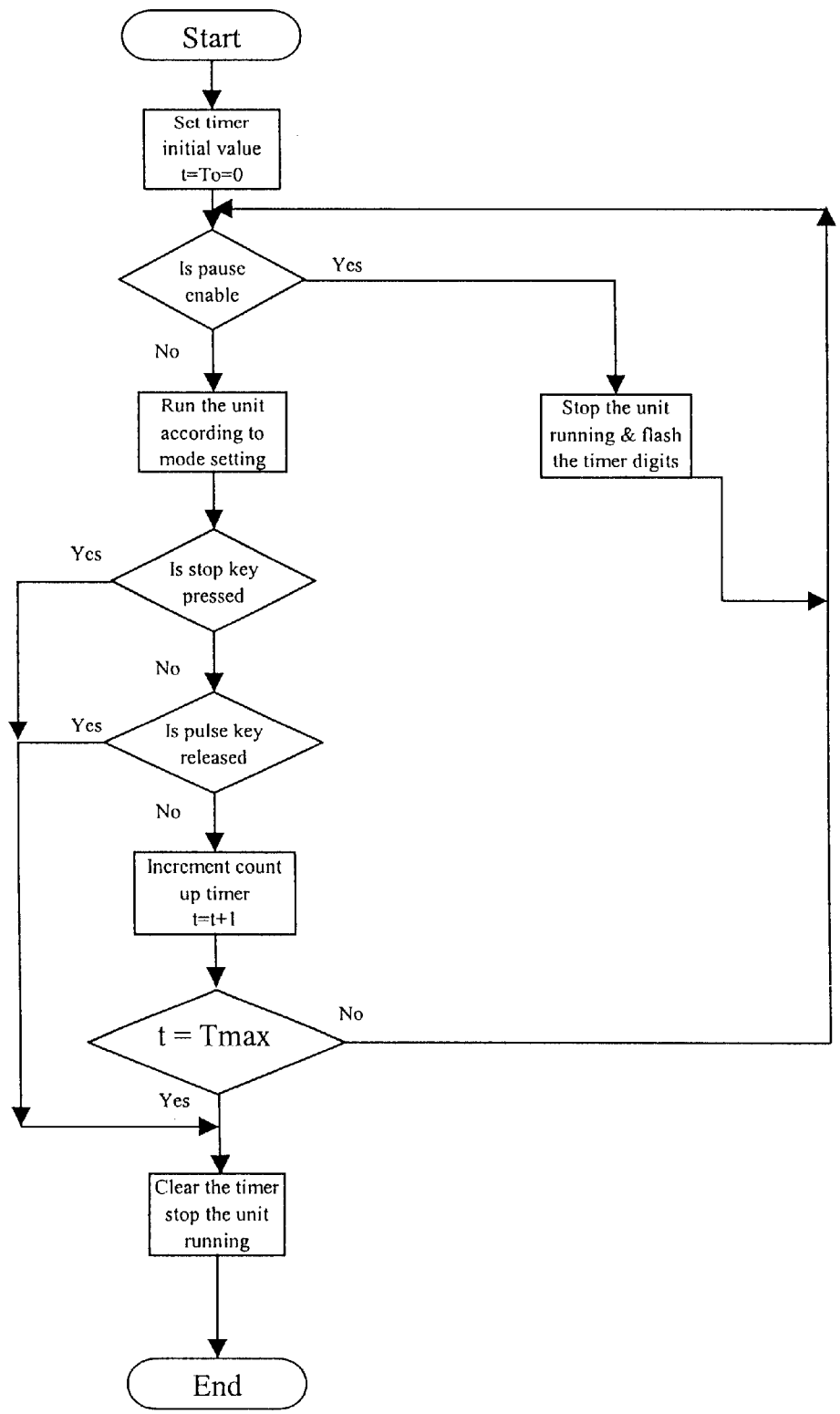
Fig. 10  Count up

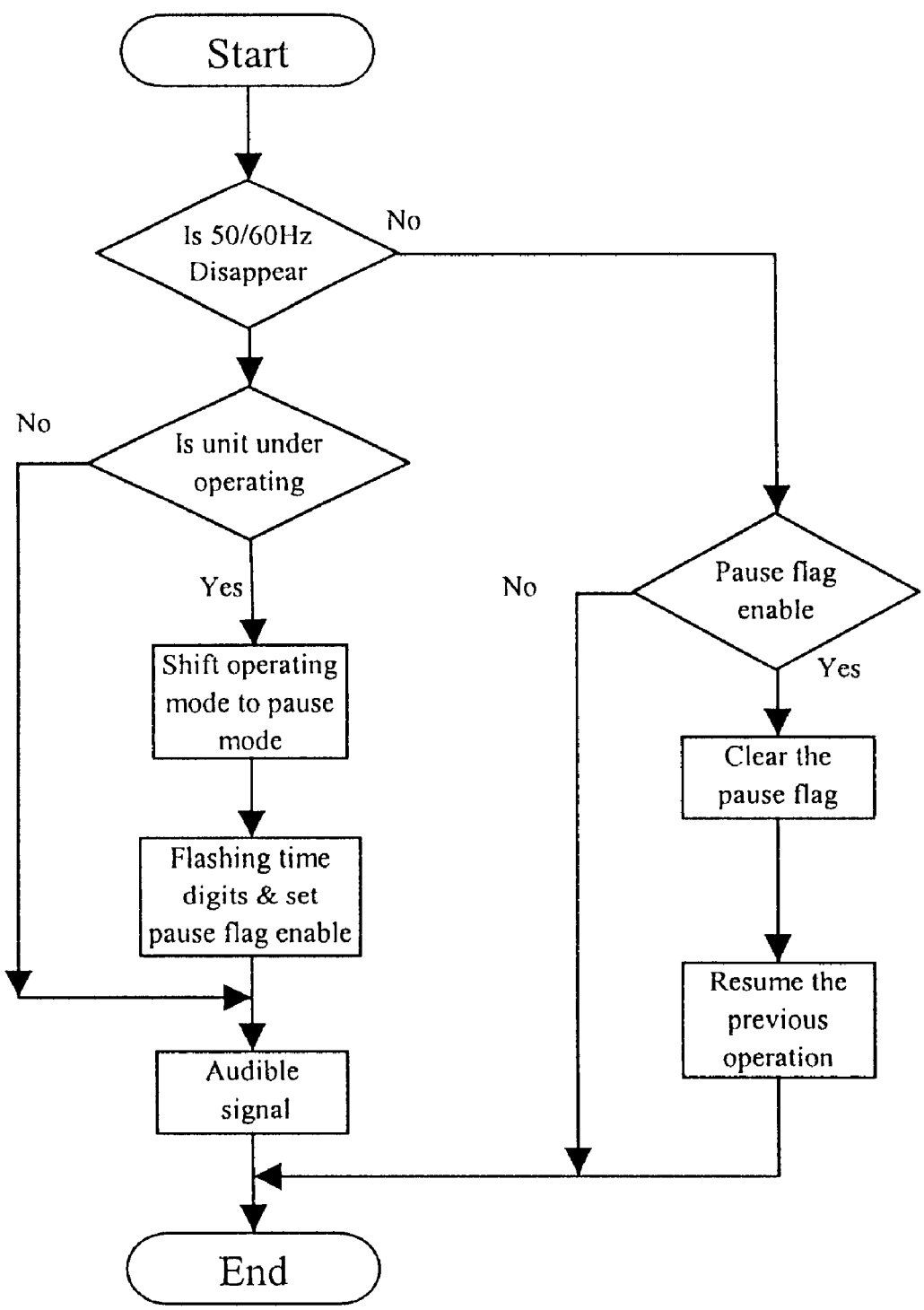
Fig. 11 Pause

ELECTRONIC FOOD PROCESSOR

BACKGROUND OF THE INVENTION

1. Field of the Invention

The present invention relates to a household food processor and more particularly to a microprocessor-based control circuit for controlling energization of the food processor drive motor.

2. Description of the Related Art

It has been traditional for food processors to have mechanical switches which permit two basic operational functions. In the first function, the switch is placed in an "on" position where the drive motor runs constantly until the switch is removed from the "on" position. A second switch (or function of the first switch) is a "momentary" or "pulse" operation where the drive motor is energized as long as the switch is held in the "pulse" position. This arrangement for controlling the drive motor of a food processor requires the user to closely attend the unit and manually control the "pulse" pattern to achieve the desired performance. Since food processors typically do not include any indication of the duration of a manually controlled cycle, the user may have difficulty reproducing a successful cycle.

The typical food processor does not include a safety mechanism related to the feeding chute. Therefore, the motor remains running even when the feeding chute has been removed, for example, to add ingredients.

Further, the typical food processor is a single speed device. The user has no option for altering the rotational speed of the drive motor.

SUMMARY OF THE INVENTION

An object of the present invention is to provide a new and improved electronic food processor that permits a user to accurately reproduce a successful food processing cycle.

Another object of the present invention is to provide a new and improved electronic food processor with enhanced convenience and safety features.

An electronic food processor in accordance with the present invention incorporates a microprocessor-based electronic control system which acts as an intelligent interface between the user and the food processor drive motor. The user interacts with the microprocessor-based control system by means of a control panel. The control panel includes a liquid crystal display (LCD), light emitting diode (LED) indicators and contact switches. The LCD and LED indicators provide feedback from the electronic control circuit to the user. The user can select among the various functions using the contact switches located on the control panel.

One of the functions selectable by the user through the keypad is the duration of a given food processing cycle. Restated, the control system permits the user to pre-determine a desired end time for the food processing cycle. When the user has selected a pre-established end time, the microprocessor control circuit causes a time remaining to be displayed on the LCD screen in a count down format. Alternatively, the user may simply start the food processor. In which case, an elapse time is displayed on the LCD in a count up format.

In accordance with another aspect of the invention, the microprocessor based control system is provided with programmed instructions for responding to inputs from the user and sensors on the food processor. The user can select an "auto-pulse" function in which the food processor drive motor is automatically cycled on and off for predetermined periods in accordance with the programmed instructions.

Safety of the electronic food processor is enhanced by including a "pause" feature that removes energy from the drive motor whenever the feed chute is removed. When the feed chute is replaced, the food processing cycle resumes. A food processing cycle can also be paused by pressing the appropriate key on the control panel.

The food processing capability of the electronic food processor is improved by providing an optional high speed for the drive motor. The high speed function can be activated at any time during food processor operation. Motor control is accomplished electronically by the microprocessor based control system in accordance with the programmed instructions and in response to user and sensor inputs.

BRIEF DESCRIPTION OF THE DRAWINGS

FIGS. 7–11 are flow charts illustrating additional portions of the programmed instructions for the electronic food processor of FIG. 1.

DETAILED DESCRIPTION OF THE PREFERRED EMBODIMENT

Figure 1:
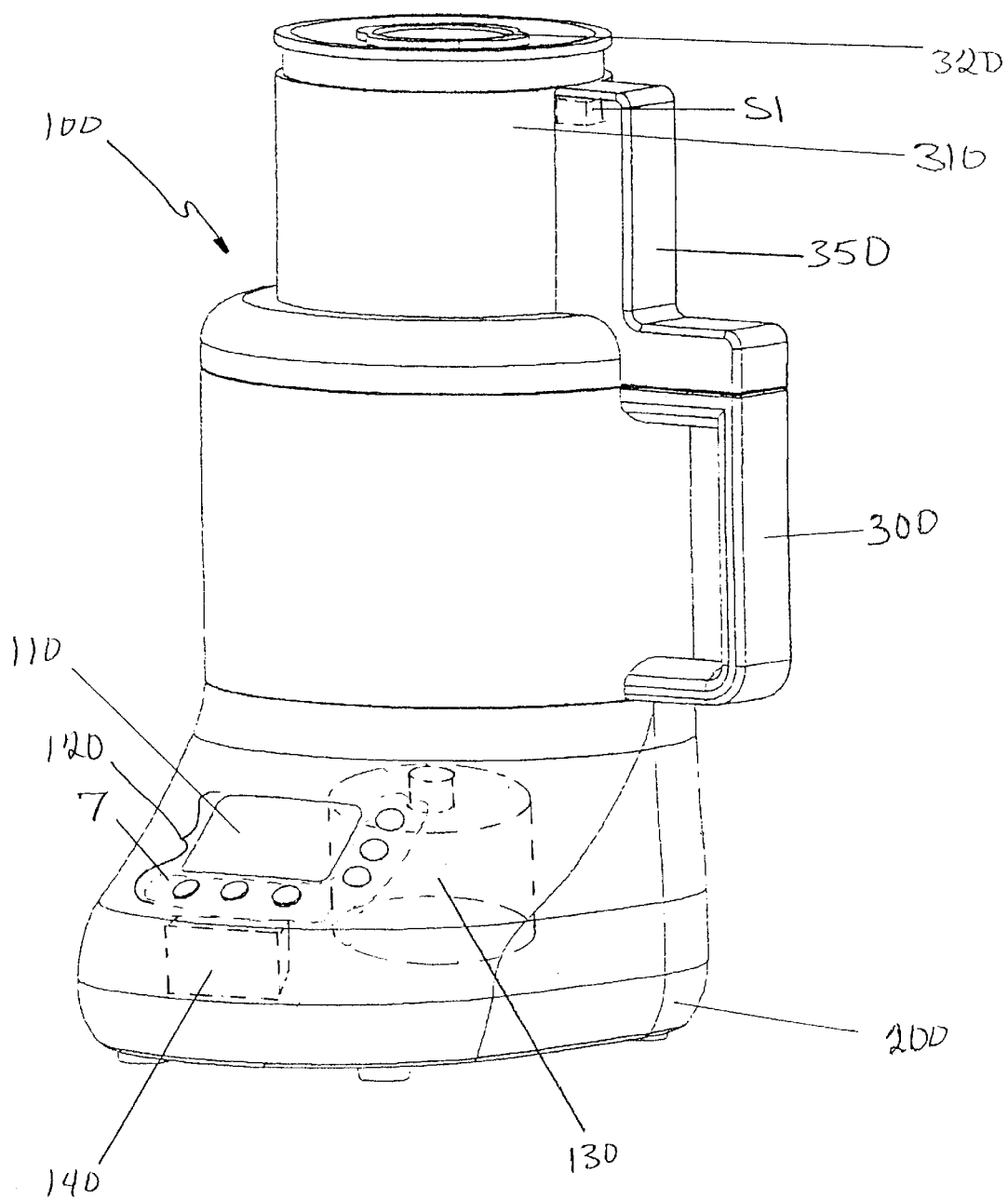
FIG. 1 is an exterior view of an electronic food processor in accordance with the present invention.

Referring more particularly to FIGS. 1–9, wherein like numbers refer to similar parts, a preferred embodiment of an electronic food processor 100 comprises a bowl 300 mated to a base 200 containing a drive motor 130, a motor control unit 140 and an exteriorly mounted control panel 120. Food bowl 300 surrounds food processing means (not illustrated) comprising exchangeable blades of different configurations as are known in the art. Cover 350 tightly encloses the top of the bowl 300. The cover 350 defines a feed chute 310 which is in turn filled by a complimentary food pusher 320. Safety switch S1 detects the presence or absence of the food pusher 320.

Figure 2:
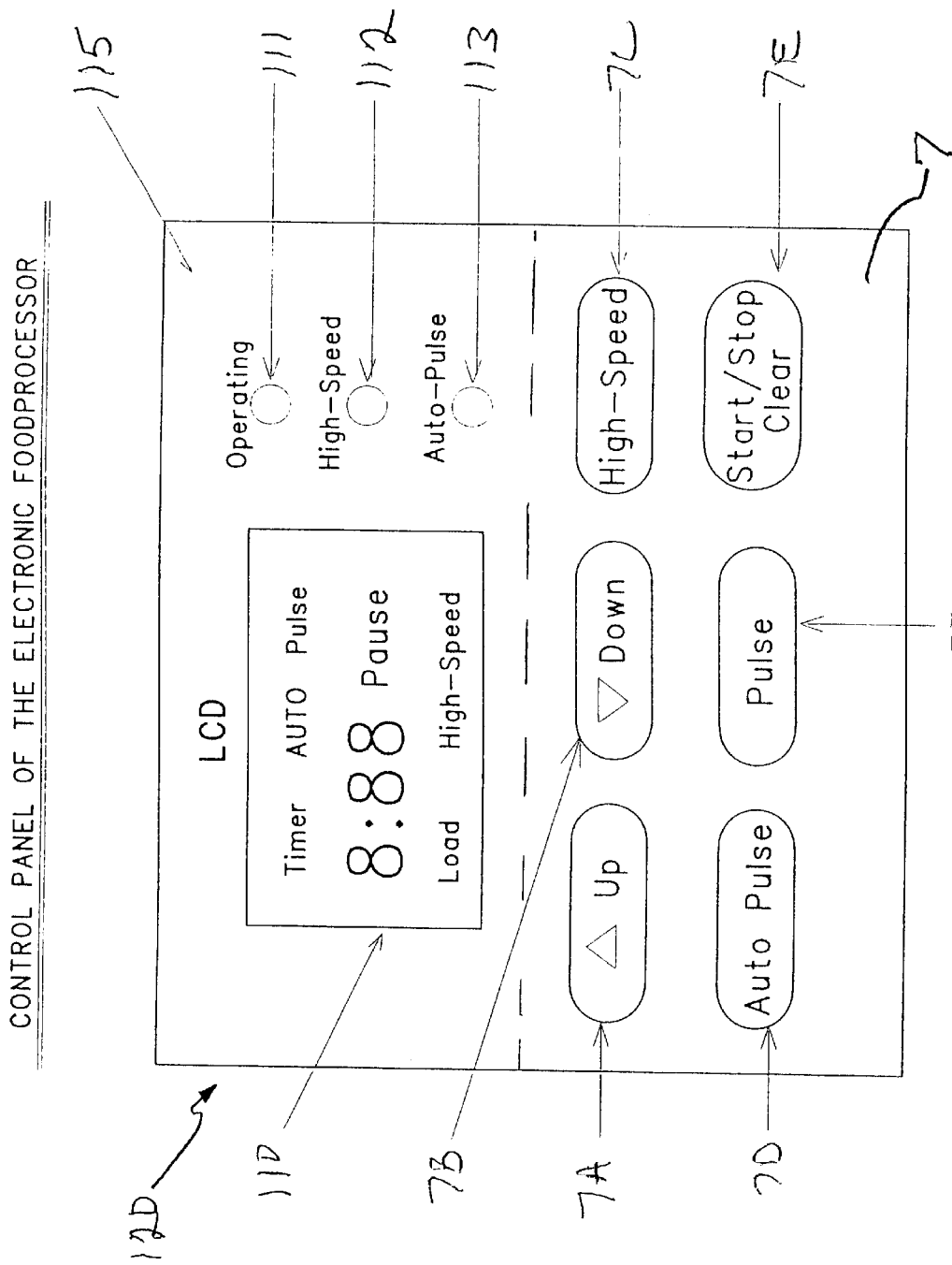
FIG. 2 is an expanded view of a control panel for use in conjunction with the electronic food processor of FIG. 1.
Figure 3:
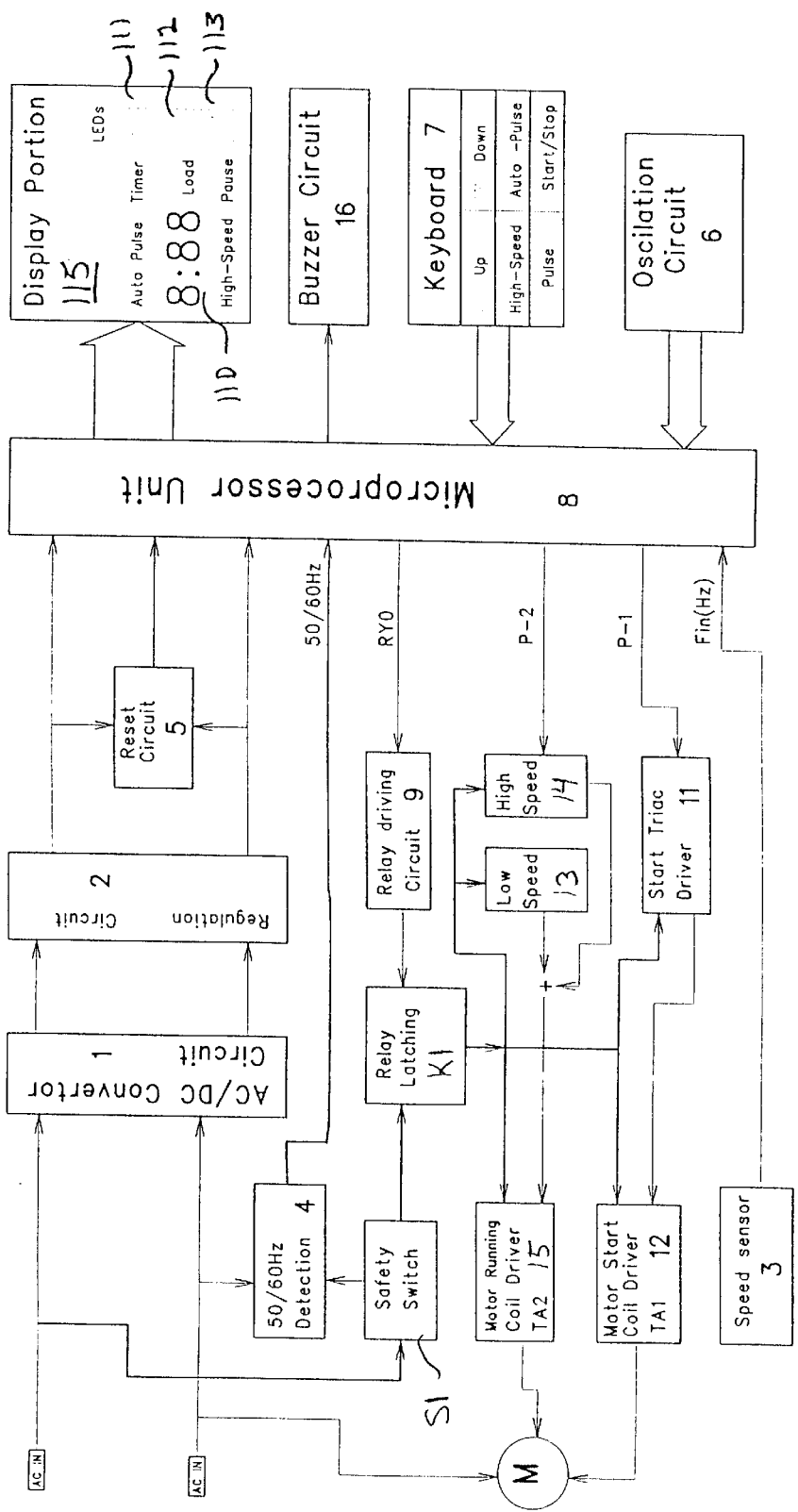
FIG. 3 is a functional block diagram of the electronic food processor of FIG. 1.

FIG. 2 illustrates a preferred embodiment of a control panel 120 in accordance with the present invention. The control panel 120 is roughly divided into a display portion 115 and a keypad 7. The keypad 7 includes six switches 7A through 7F, the function of which will be discussed below. Display portion 115 includes an LCD 110 for display of times relevant to food processor operation, preferably in digital format. The LCD 110 also includes icons for visual indication of various conditions related to the food processor. Display portion 115 also includes three LEDs 111–113, the function of which will also be discussed below. Some conditions, such as the auto pulse and high speed functions, are indicated by both an icon on the LCD and an LED.

The functions and components of the electronic food processor are best introduced with reference to the functional block (FIG. 3) and schematic (FIG. 4) diagrams. Household alternating current (AC) enters FIGS. 3 and 4 in the upper left corner on lines labeled AC IN which correspond to an AC power cord. Plugging in the electronic food processor provides alternating current to an AC/DC converter circuit 1 and regulator 2 which together supply direct current to the microprocessor unit 8 and other electronic components of the food processor 100. At power-up, reset circuit 5 generates a reset signal to the microprocessor unit 8, initializing the microprocessor unit and setting it to a standby mode.

Figure 4:
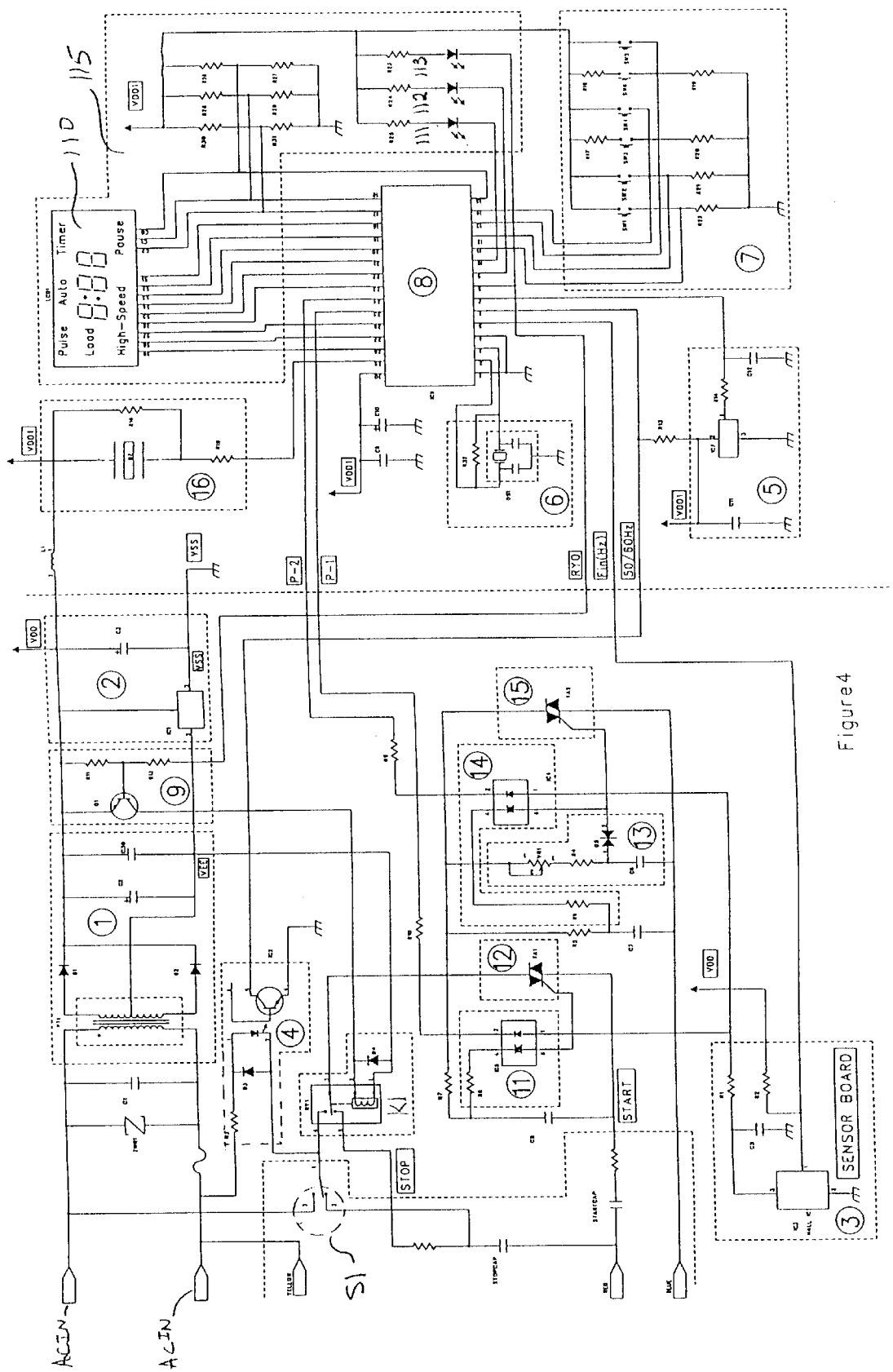
FIG. 4 is a schematic diagram illustrating the circuitry of the electronic food processor of FIG. 1.

AC is also provided to an isolated zero cross detection circuit 4. One leg of the AC is connected to an photo-coupler IC2 by a current limiting resister R3 and shunt diode D3. This arrangement causes one-half of each AC cycle to pass through an LED in photo-coupler IC2. The photo-coupler IC2 produces a signal 50/60 Hz corresponding to each zero cross of the AC current and provides this signal to the microprocessor unit 8 where it is used for motor control. With particular reference to FIG. 4, it can be seen that safety switch S1 is arranged to, in one position complete the AC circuit through zero cross detection circuit 4, and in another position disconnect zero cross detection circuit 4 from the AC. When the AC circuit through zero cross detection circuit is complete, photo-coupler IC2 will provide the 50/60 Hz signal to the microprocessor unit 8. When the AC circuit is not complete through zero cross detection circuit 4, no 50/60 Hz signal will be provided to microprocessor unit 8. The significance of the presence or absence of the 50/60 Hz signal at the microprocessor unit 8 will be further discussed below.

With continuing reference to FIG. 4, safety switch S1 also provides one leg of alternating current to motor coil drivers 12 and 15 through relay K1. It will be understood by those of skill in the art from FIG. 4 that the other leg of AC is provided directly to the motor. Relay K1 is energized by relay driving circuit 9, which is in turn controlled by signal RYO from the microprocessor unit 8. When signal RYO is a logic level "0", relay K1 is energized and connects motor coil drivers 12 and 15 to one leg of the alternating current. If relay K1 is not energized by the microprocessor unit 8, the motor coil drivers 12 and 15 do not have access to AC. Restated, when signal RYO is logic level "1", drive motor 130 cannot run.

An oscillator circuit 6 provides a clock signal to the microprocessor unit 8. This clock signal is used by the microprocessor unit 8 to organize its internal functions.

A sensor board 3 includes a hall effect sensor integrated circuit IC3 whose function is to detect the speed of motor 130 and produce a signal Fin corresponding to that speed. Signal Fin is provided to microprocessor unit 8 for use in regulating the speed of motor 130.

Buzzer circuit 16 responds to signals from the microprocessor unit 8 to provide an audible indication of a pause condition as will be discussed below.

Activation of relay K1 by microprocessor unit 8 applies AC to the low speed triac driving circuit 13 to generate a trigger signal through trigger diode D5. The trigger signal is received by motor running coil driver 15. This trigger signal causes pulses of alternating current to be applied to drive motor 130 through triac TA2. The energy provided by motor running coil driver 15 through triac TA2 using the signal from low speed triac driving circuit 13 is sufficient to maintain the drive motor 130 at a predetermined normal running speed.

However, in a food processor it is important that the drive motor 130 attain this normal running speed as quickly as possible. To facilitate a rapid increase in motor speed, the drive motor 130 is equipped with a start coil (not illustrated) as is known in the art. A logic level "0" on line P1 generated by microprocessor unit 8 is used by start up triac driving circuit 11 to trigger motor start coil driver 12. The motor start coil driver 12 provides additional AC power to the start coil of drive motor 130, bringing the motor up to speed rapidly. By monitoring signal Fin from the sensor board 3, the microprocessor can detect when the motor has achieved the desired running speed. When the motor has achieved the desired running speed, microprocessor unit 8 terminates power to the start coil of the motor 130 by making line P1 a logic level "1".

During drive motor 130 operation, closing switch 7C on the keyboard can activate an optional high speed. Actuation of switch 7C causes microprocessor unit 8 to place a logic level "0" on line P2. This turns on high speed triac driving circuit 14 which augments the trigger signal generated by low speed triac driving circuit 13. This augmented, or high speed trigger signal causes TA2 to supply additional AC current to the running coil of the drive motor 130. Sensor board 3 detects the increase speed of the motor 130 and relays this signal to the microprocessor unit 8. The signal P2 is regulated by microprocessor unit 8 to maintain the motor 130 at the desired high speed as will be discussed below.

It should be understood that the microprocessor unit 8 requires the 50/60 Hz signal generated by the 0 cross detection circuit 4 to generate signals RYO, P1 and P2 related to motor operation. Removal of the safety chute alters the position of the safety switch S1 making the AC circuit through zero cross detection circuit 4 incomplete which terminates the 50/60 Hz signal. It can be seen from FIG. 4 that changing the state of switch S1 also removes the leg of AC power passing through relay K1 to motor run coil driver and motor start coil driver 15 and 12 respectively. Thus, in a redundant manner, a change of state of switch S1 removes power from the drive motor 130.

The various functions of the circuit illustrated in FIG. 4 discussed above are coordinated by the microprocessor unit 8 in response to signals generated by the zero cross detection circuit 4 (50/60 Hz), reset circuit 5, oscillator circuit 6, sensor board 3 (Fin), and keyboard 7 as will be discussed below with reference to FIGS. 5–10. As a preliminary matter, it should be understood with reference to FIG. 4 that placing signal line RYO at a logic level "0" will turn on Q1 in relay driving circuit 9, energizing relay K1 and activating low-speed triac driving circuit 13. Placing signals P1 and P2 at logic level "0" causes current to flow through photocouplers IC5 and IC4 in start up triac driving circuit 11 and high speed triac driving circuit 14, respectively. It should be apparent that microprocessor unit 8 can control the trigger signals generated in triac driving circuits 11, 13 and 14 by its control of signals RYO, P1 and P2.

Figure 5:
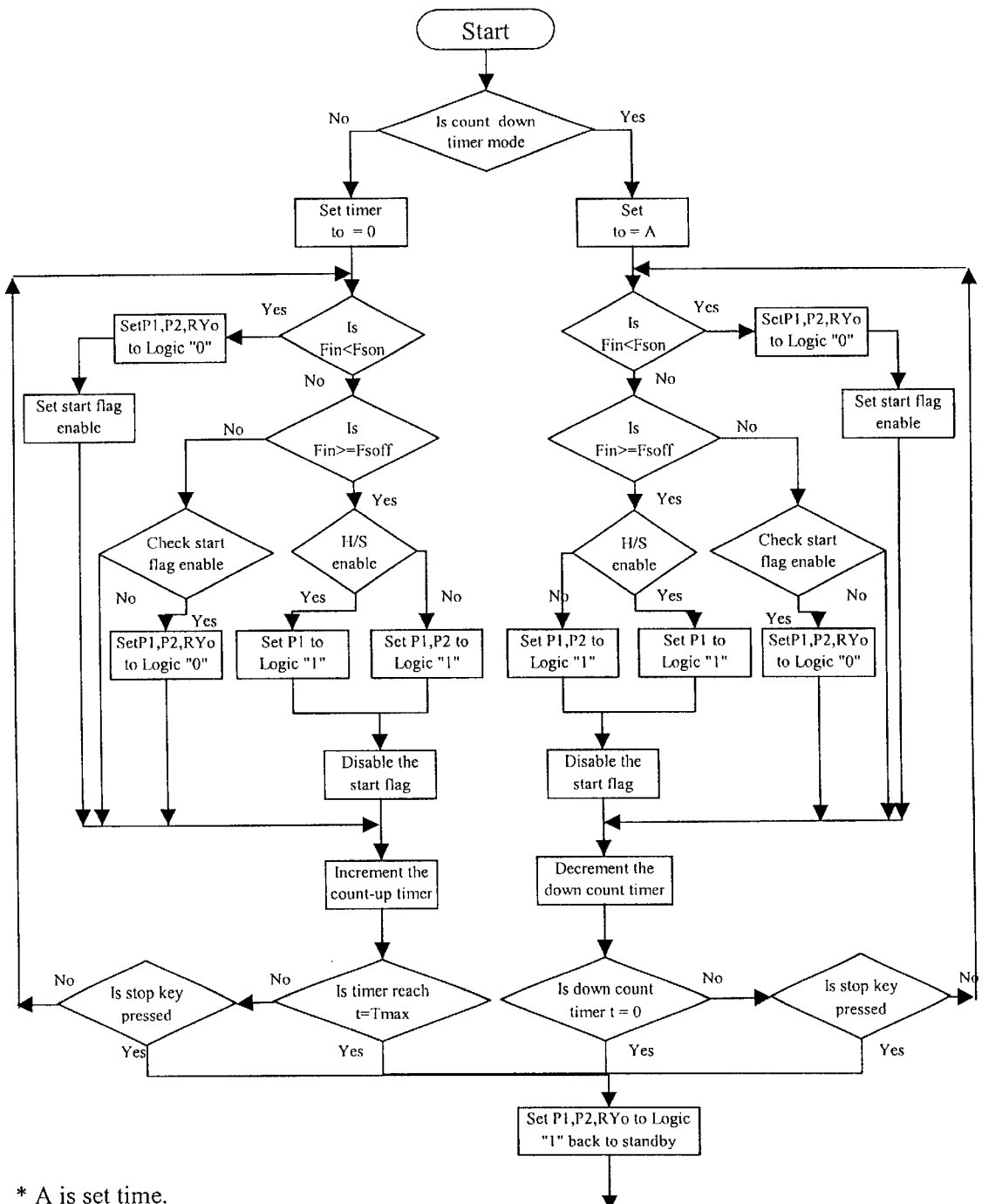
FIG. 5 is a flow chart illustrating one portion of the programmed instructions for the electronic food processor of FIG. 1.

FIG. 5 illustrates an overall flowchart of the program stored in memory in microprocessor unit 8. The program is activated by closure of the start button 7E. With reference to FIG. 2 switch 7E is a multifunction switch labeled start/stop/clear. For clarity, switch 7E will be referred to as the start switch 7E. First closure of the start switch 7E initiates the program illustrated in FIG. 5. The first decision made by the program is to decide whether a countdown mode has been selected. The countdown mode is activated by a user selecting a desired end time using the up and down switches 7A, 7B. If a pre-established end time has been selected, the right-hand branch of FIG. 5 will be used. If no desired end time has been selected, the left-hand branch of FIG. 5 will be used.

The difference between the left and right-hand branches of FIG. 5 is essentially that the right branch displays a countdown or time remaining on the LCD and operates in the selected function until the user selected time has elapsed. The left branch displays a count-up time corresponding to a time elapsed from activation of the drive motor and continues to count-up until the unit is stopped by the user or a pre-established maximum run time Tmax is achieved.

Within the left and right branches the function of the program is very similar. A timer is set either to A (the pre-selected time) or 0. The program illustrated in FIG. 5 is a program that manipulates signals RYO, P1 and P2 to regulate the rotational speed of drive motor 130. The program compares motor speed signal Fin from the sensor board 3 to two pre-established standard Fson and Fsoff. If the measured motor speed Fin is less than Fson, the program holds RYO, P1 and P2 low. If the measured motor speed Fin is greater than Fson, it is then compared to Fsoff.

When the measured motor speed Fin exceeds or is equal to Fsoff, the program looks to see if the "high-speed" function is activated, in which case RYO, P1 and P2 are held low delivering max power to the coils of the driver motor. 130. If the "high-speed" function is not activated, the program sets both P1 and P2 to logic level "1", turning off the start triac driver 11 and the high speed triac driver 14. This leaves the drive motor 130 with power delivered through motor running coil driver 15 as triggered by low speed triac driver 13.

The first step after timer setting is to look at the motor speed Fin as detected by the sensor board 3. If the motor speed detected Fin is less than Fson then signals P1, P2 and RYO are set to logic level 0. Setting RYO, P1, and P2 to logic level 0 causes all of the triac driving circuits 11, 13, and 14 to become active simultaneously. This causes the drive motor 130 to rapidly increase speed. A start flag is then enabled. Start flag enable causes LED 111 to be lit indicating that the motor is operating. The respective timer is incremented or decremented depending on which branch of FIG. 5 is operational. If the maximum time Tmax or pre-elected time A has not elapsed and the stop key is not pressed, the program returns to detecting motor speed. If the motor speed has not achieved the desired run speed Fson, program remains in the previously described loop.

At some point the motor speed will exceed Fson, at which point the program moves to the next step and compares the motor speed Fin to a predetermined "start off" speed Fsoff. If the motor speed is not greater than or equal to Fsoff, P1, P2 and RYO are maintained at logic level 0. If the motor speed Fin is greater than or equal to Fsoff, the program asks whether high-speed function is enabled. If yes, only P1 is set to a logic level 1 (meaning that P2 and RYO remain at logic level 0 supplying an augmented trigger signal to motor running coil driver 15 triac TA2). If high speed is not enabled, P1 and P2 are both set to logic level 1 (meaning signal RYO is maintained at logic level 0 which, supplies an unaugmented trigger signal through low speed triac driver 13 to motor running coil driver 15 triac TA2. The appropriate timer is incremented or decremented, and if the time (A or Tmax) has not expired and the stop key has not been pressed, the process begins again.

This loop program continuously compares detected motor speed Fin to pre-established motor start speed Fson and start off speed Foff, respectively. The motor speed is brought quickly to speed Fsoff and maintained there (unless the "high speed" function is activated) by manipulating P1, P2 and RYO as described above. The high-speed function is available any time the motor is running.

Figure 6:
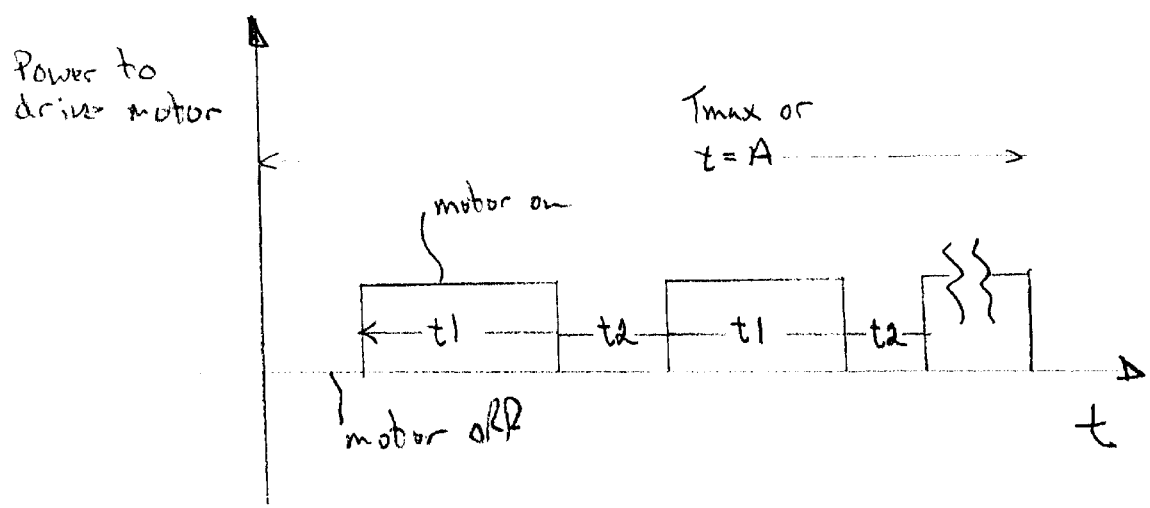
FIG. 6 is a graphical illustration of the auto-pulse function.

The electronic blender is provided with an auto pulse function in which the microprocessor unit operates a drive motor 130 in on-off cycles corresponding to arbitrary predetermined on-off cycle times Ton and Toff respectively. FIGS. 6 and 7 illustrate the condition of drive motor 130 and the program producing the auto pulse function in the electronic blender 100, respectively. FIG. 7 has left and right branches corresponding to count-up and count-down portions of the program. The count-down mode is selected by the user using the up- down keys to establish a desired food processing cycle duration. A food processing duration timer t3 is used to regulate the overall food processing cycle duration. If a predetermined food processing cycle duration A has been selected by a user, the right branch of FIG. 7 sets timer t3 equal to the user selected duration A. If there is no user selected duration, the left branch of FIG. 7 sets timer t3 equal to 0. In either branch, while the food processor is operating in auto pulse mode, the program steps utilize timers t1 and t2 to cycle the drive motor on and off (as best illustrated in FIG. 6) until the pre-selected duration A or Tmax has been achieved. The time values of t1 and t2 are arbitrary times and may be different for the "high-speed" function.

FIG. 8 illustrates a program loop related to activation of the high-speed function. During food processor operation, the microprocessor unit 8 is programmed to detect closure of the high speed switch 7C. If the high speed switch 7C is not closed, operation of the food processor continues undisturbed. A first closure of the high speed switch 7C causes the microprocessor unit 8 to ask whether the high speed mode is already enabled. If the high speed mode is not enabled, the microprocessor unit enables the high speed flag, turns on LED 112 and the high speed icon on the LCD 110. The high speed flag is utilized to answer the question HS enable in FIG. 5 left and right branches.

If the high speed mode is already enabled (meaning this is a second closure of the high speed switch 7C) the microprocessor unit 8 disables the high speed flag and turns off LED 112 and the high speed icon on the LCD 110. Thus, it can be seen that a first closure of the high speed switch 7C during food processor operation enables the high speed mode, whereas a second closure of the high speed switch 7C during food processor operation disables the high speed mode. The program of FIG. 5 responds to enablement of the high speed mode as previously described.

FIG. 9 illustrates how the microprocessor unit is programmed to operate the digital display when the user has selected a food processing cycle duration, i.e., in the count-down mode. The microprocessor unit 8 sets the display to an initial value A corresponding to the user defined food processing cycle duration. The program then asks if pause is enabled. Pause can be enabled in two ways in accordance with the present invention. First, if the position of safety switch S1 is changed during food processor operation (indicating removal of the food pusher 320) or, alternatively, if start switch 7E is closed during food processor operation. If pause is enabled, the drive motor is stopped. When the pause mode is enabled, the microprocessor is programmed to stop the unit by removing power from the drive motor 130 and flash the timer digits. If the pause mode is not enabled, the unit runs according to its mode setting (FIG. 5). The timer is decremented until t equals 0, at which time the drive motor 130 is stopped and the timer is cleared.

FIG. 10 illustrates program loop corresponding to the count-up mode. The only difference between FIG. 9 and FIG. 10 is that the initial timer is set to 0 and incremented in FIG. 10. In this program loop of FIG. 10, the food processor drive motor will run in accordance with the mode setting and pause condition until the stop key is pressed, the pulse key is released, or the predetermined maximum time Tmax is achieved.

FIG. 11 illustrates the program loop related to the pause mode. If the 50/60 Hz signal disappears (switch S1 changes position) and the unit is operating, the microprocessor unit shifts the operating mode to pause mode (see FIGS. 9 and 10). Pause mode causes the displayed time digits to flash and activates the pause icon on the LCD. While the unit is in pause mode an audible signal is generated by the buzzer circuit 16. When switch S1 is returned to its safe position, 50/60 Hz returns, the pause flag is cleared and the food processor returns to its previous operation at the moment the pause flag was enabled. Restated, whatever time is displayed when the pause flag is enabled freezes and flashed until the pause flag is disabled. When the pause flag is disabled, the program resumes at the time displayed.

While a preferred embodiment of the foregoing invention has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. An electronic food processor comprising:
   a drive motor for conversion of electrical energy to rotational force;
   programmable motor control means for controlling the electrical energy delivered to said drive motor, said programmable motor control means comprising;
   energy delivery means for delivering electrical energy to said drive motor, said energy delivery means responsive to a plurality of signals to initiate, terminate or vary the quantity of electrical energy delivered to said drive motor; and
   microprocessor means for storing and carrying out programmed instructions, said microprocessor means providing said plurality of signals to said energy delivery means,
   wherein said programmed instructions comprise sets of instructions defining patterns of said plurality of signals that result in a plurality of corresponding rotational force patterns being produced by said drive motor.

2. The electronic food processor of claim 1, wherein said plurality of rotational force patterns comprise:
   a normal speed pattern in which said drive motor provides rotational force sufficient to induce rotation of said drive motor at a pre-determined normal rotational frequency.

3. The electronic food processor of claim 2, wherein said plurality of rotational force patterns comprise:
   a high-speed pattern in which said drive motor provides rotational force sufficient to induce rotation of said drive motor at a pre-determined maximum rotational frequency, said maximum rotational frequency being greater than said normal rotational frequency.

4. The electronic food processor of claim 1, wherein said plurality of rotational force patterns comprise:
   an auto-pulse pattern in which said drive motor provides rotational force for a pre-determined time period $t_1$ followed by a pre-determined period $t_2$ wherein said drive motor does not provide rotational force, wherein said time periods $t_1$ and $t_2$ repeat.

5. The electronic food processor of claim 1, further comprising:
   display means for display of time values related to said patterns of said plurality of signals, said display means responsive to said programmable motor control means to display a time elapsed from initiation of each said pattern or a remainder of a pre-determined duration for each said pattern if a pre-determined duration for said pattern is selected prior to said initiation.

6. The electronic food processor of claim 5, wherein said time elapsed is displayed in a count-up format and said remainder is displayed in a count down format.

7. The electronic food processor of claim 1, further comprising a plurality of switches, each of said switches arranged such that a change of state of said switch provides an input to said programmable motor control means, each said input causing said programmable motor control means to carry out a particular subset of said programmed instructions.

8. The electronic food processor of claim 1, wherein said programmable motor control means comprises:
   sensor means for sensing a rotational speed of said drive motor means and transmitting a signal (Fin) corresponding to said rotational speed to said programmable motor control means, said programmable motor control means responsive to said signal (Fin) to alter said patterns of said plurality of signals in accordance with said programmed instructions.

9. The electronic food processor of claim 1, wherein said food processor comprises:
   safety switch means for providing a safety signal to said programmable motor control means, said programmable motor control means responsive to the presence or absence of said safety signal to permit or prevent energization of said drive motor means.

10. The electronic food processor of claim 7, wherein a change of state of at least one of said plurality of switches provides a pause signal to said programmable motor control means,
    wherein said programmable motor control means is responsive to said pause signal to carry out programmed instructions that interrupt whichever of said patterns of said plurality of signals being produced, thereby removing electrical energy from said drive motor, and a second change of state of said at least one of said plurality of switches removes said pause signal and said programmable motor control means is responsive to removal of said pause signal to restore said interrupted pattern of said plurality of signals, thereby restoring said corresponding rotational force pattern.

11. An electronic food processor comprising:
    drive motor means for converting electrical energy into rotational motion;
    energy delivery means for transmitting said electrical energy to said drive motor means;
    programmable motor control means for controlling the electrical energy delivered to said drive motor means through said energy delivery means, said programmable motor control means comprising:
    programmed instructions;
    memory means for storing said programmed instructions; and
    processing means for carrying out said programmed instructions;
    display means for displaying a time relevant to delivery of electrical energy to said drive motor means, said time provided by said programmable motor control means; and
    a plurality of switches for providing inputs to said programmable motor control means, wherein said programmable motor control means is responsive to said inputs to carry out portions of said programmed instructions, at least one of said inputs defining a pre-determined processing cycle duration, said defining a pre-determined processing cycle duration causing said programmable motor control means to carry out a portion of said programmed instructions that operates said display in a count down mode by displaying a remainder of said pre-determined processing cycle duration.

12. The electronic food processor of claim 11, wherein said programmed instructions operate said display in a count-up mode in the absence of a pre-determined processing cycle duration by displaying an elapsed time beginning with a start of energy delivery to said drive motor means.

13. The electronic food processor of claim 11, comprising:

sensing means for sensing a rotational frequency of said drive motor means and providing a signal (Fin) corresponding to said rotational frequency to said programmable motor control means, wherein said programmable motor control means compares said signal (Fin) to minimum (Fson) and maximum (Fsoff) rotational frequency values contained in said programmed instructions and utilizes these comparisons to maintain the rotational speed of said drive motor means substantially constant.

14. The electronic food processor of claim 11, wherein said programmable motor controller is responsive to at least one of said inputs to carry out a first portion of said programmed instructions which causes said energy delivery means to deliver a first amount of electrical energy to said drive motor means, and said programmable motor controller is responsive to at least one of said inputs to carry out a second portion of said programmed instructions which causes said energy delivery means to deliver an intermittent supply of said electrical energy to said drive motor means, and said programmable motor controller is responsive to at least one of said inputs to carry out a third portion of said programmed instructions which causes said energy delivery means to deliver a second amount of electrical energy to said drive motor means, wherein said second amount is greater than said first amount and results in a faster rotational frequency of said drive motor means.

15. The electronic food processor of claim 11, wherein at least one of said switches provide a pause input to said programmable motor control means and said programmable motor control means is responsive to the appearance of said pause input to carry out a portion of said programmed instructions which freezes said timer and interrupts delivery of electrical energy to said drive motor means and said programmable motor control means is responsive to disappearance of said pause input to carry out a second portion of said programmed instructions which restores timer operation and the delivery of electrical energy at the point at which the appearance of the pause signal caused them to be frozen and interrupted, respectively.

16. An electronic food processor comprising:

a drive motor;

programmable motor control means for controlling the delivery of electrical energy to said drive motor;

wherein said programmable motor control means includes a program for an auto-pulse pattern in which electrical energy is delivered to said drive motor for a pre-determined period of time $t_1$ followed by a pre-determined period $t_2$ during which no electrical energy is delivered to said drive motor, wherein said periods $t_1$ and $t_2$ repeat.

17. The electronic food processor of claim 16, further comprising a plurality of switches for providing inputs to said programmable motor control means, wherein at least one of said switches provides a pause input to said programmable motor control means, the presence of said pause input causing said programmable motor control means to interrupt delivery of electrical energy to said drive motor and the absence of said pause signal causing said programmable motor control means to permit delivery of electrical energy to said drive motor.

18. The electronic food processor of claim 17, further comprising a timer display on which said programmable motor control displays elapsed or remaining times relevant to the delivery of electrical energy to said drive motor, wherein the presence of said pause signal causes said programmable motor control means to freeze the time on said display and the removal of said pause signal causes said programmable motor control means to resume counting at the frozen time on said display.

* * * * *

UNITED STATES PATENT AND TRADEMARK OFFICE
CERTIFICATE OF CORRECTION

PATENT NO. : 6,397,735 B1  Page 1 of 1
DATED : June 4, 2002
INVENTOR(S) : Wong

It is certified that error appears in the above-identified patent and that said Letters Patent is hereby corrected as shown below:

<u>Title page,</u>
Item [75], Inventor, delete "Wal" and insert -- Wai --.

Signed and Sealed this

Fourteenth Day of January, 2003

JAMES E. ROGAN
*Director of the United States Patent and Trademark Office*